S. P. CONNOR & P. D. PFISTERER.
Shafts for Vehicles.
No. 139,117.　　　　　　　　　　Patented May 20, 1873.
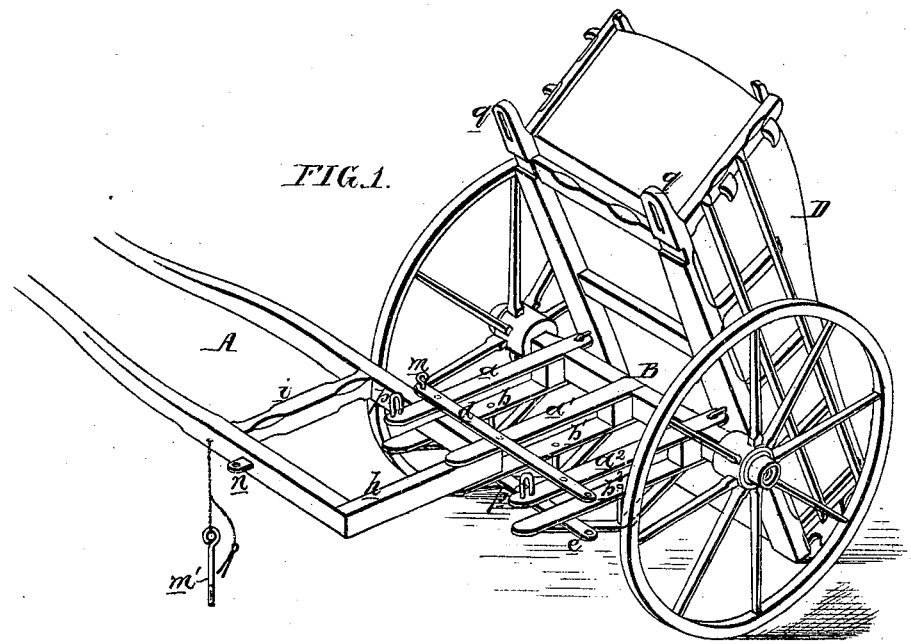
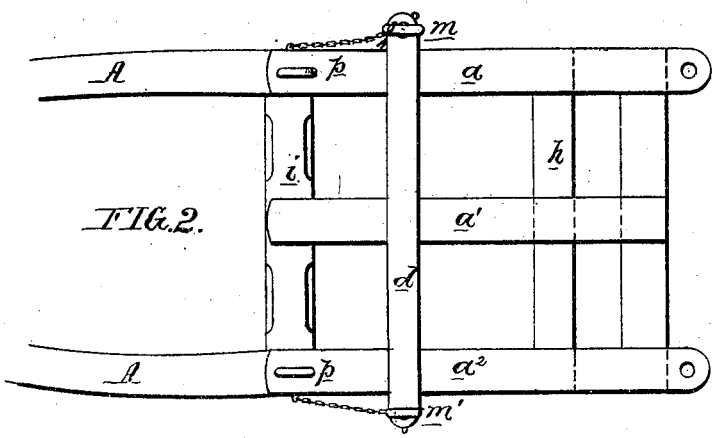
Witnesses, Thomas McIlvain
Harry Smith
P. D. Pfisterer and
S. P. Connor
by their Attys
Howson and Son

UNITED STATES PATENT OFFICE.

SAMUEL P. CONNOR, OF CONSHOHOCKEN, AND PHILIP D. PFISTERER, OF PHILADELPHIA, PENNSYLVANIA.

IMPROVEMENT IN SHAFTS FOR VEHICLES.

Specification forming part of Letters Patent No. 139,117, dated May 20, 1873; application filed March 15, 1873.

*To all whom it may concern:*

Be it known that we, SAMUEL P. CONNOR, of Conshohocken, Montgomery county, Pennsylvania, and PHILIP D. PFISTERER, of Philadelphia, Pennsylvania, have invented an Improvement in Vehicles, of which the following is a specification:

The object of our invention is to so construct a cart that it can receive its load from and discharge it onto the sidewalk of the street without interfering with the free travel of street-cars and other vehicles.

This object we attain by so connecting the shafts A to the axle B that the former can be readily removed to a position at right angles, or thereabout, to the latter, as shown in the perspective view, Figure 1, of the accompanying drawing, thereby permitting the horse to stand in a position which does not materially interfere with passing vehicles.

The body D of the cart is, in the present instance, of the form usually adopted in carts for carrying coal, and is so connected to the axle that it can be readily tilted. To the axle, at right angles to the same, are secured the three upper bars $a$, $a'$, and $a''$, and three lower bars, $b$, $b'$, and $b''$, the upper set of bars being connected together by a cross-bar, $d$, and the lower set by a like cross-bar, $e$. The rear end of the shafts, where they are connected together by transverse pieces $h$ and $i$, fit freely between the two sets of axle-bars, and can be hinged either to one end or the other of the cross-bars $d$ and $e$. In Fig. 1, for instance, the only means of connecting the shafts to the axle is a pin, $m$, which passes through the far ends of the bars $d$ and $e$, and through a staple at the far side of the shafts, which can, consequently, be turned out of the way of street-cars and other passing vehicles, as shown. If it is desirable to turn the shafts in a contrary direction a pin, $m'$, may be passed through the near ends of the bars $d$ and $e$, and through the staple $n$, the pin $m$ being, of course, withdrawn; and when the cart has to be restored to its normal condition both pins are brought into use to connect the opposite sides of the shafts to the cross-bars $d$ and $e$, and the body of the cart is depressed so that staples $p$ $p$ on the bars $a$ and $a''$ (see plan view, Fig. 2) shall pass through slots in the projections $q$ $q$ of the cart-body, when the latter can be secured to the shafts by the usual trunnion-bolt passing through the staples.

A pole for two horses may be substituted for the shafts in a manner needing no description.

The double-trussed frame, consisting of the upper and lower series of bars, is an important feature, as it serves to preserve a rigid connection of the body and shafts, whatever may be the position of the latter.

It will be seen that the lower series of bars are strengthened by metal counter-braces arranged beneath them.

It is important that the joints on which the shafts turn shall be at the sides of the frame, and forward of the wheels; otherwise (unless the body was increased unduly in length) the frame could not be turned to a sufficient extent.

Claims.

1. A vehicle having the shafts or tongue secured to the duplex frame by two detachable pins at the sides of the frame and in front of the wheels, and upon either of which the shafts may be turned, as set forth.

2. The duplex frame, consisting of the upper and lower series of bars, between which the shaft or pole frame may be turned to either side.

In testimony whereof we have signed our names to this specification in the presence of two subscribing witnesses.

SAMUEL P. CONNOR.
PHILIP D. PFISTERER.

Witnesses:
WM. A. STEEL,
HUBERT HOWSON.